United States Patent
Drewes et al.

(10) Patent No.: US 7,861,598 B2
(45) Date of Patent: Jan. 4, 2011

(54) PRESSURE TRANSDUCER

(75) Inventors: Ulfert Drewes, Müllheim (DE); Frank Hegner, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 400 days.

(21) Appl. No.: 11/631,036

(22) PCT Filed: Jun. 14, 2005

(86) PCT No.: PCT/EP2005/052723

§ 371 (c)(1),
(2), (4) Date: Sep. 30, 2008

(87) PCT Pub. No.: WO2006/000534

PCT Pub. Date: Jan. 5, 2006

(65) Prior Publication Data

US 2009/0211363 A1  Aug. 27, 2009

(30) Foreign Application Priority Data

Jun. 29, 2004   (DE) ...................... 10 2004 031 582

(51) Int. Cl.
*G01L 7/00* (2006.01)
(52) U.S. Cl. ........................................................ 73/756
(58) Field of Classification Search ................ None
See application file for complete search history.

(56) References Cited

U.S. PATENT DOCUMENTS

| | | | |
|---|---|---|---|
| 5,665,920 A * | 9/1997 | Martin | ........................ 73/715 |
| 5,665,921 A | 9/1997 | Gerst | |
| 5,824,909 A | 10/1998 | Kathan | |
| 6,282,966 B1 * | 9/2001 | Probst et al. | .................. 73/715 |
| 6,474,169 B1 | 11/2002 | Aizawa | |
| 6,591,687 B1 | 7/2003 | Bjoerkman | |
| 2003/0151126 A1 | 8/2003 | Scheurich | |
| 2004/0040383 A1 * | 3/2004 | Banholzer et al. | ............. 73/712 |

(Continued)

FOREIGN PATENT DOCUMENTS

DE        42 34 290 A1   4/1994

(Continued)

*Primary Examiner*—Andre J Allen
(74) *Attorney, Agent, or Firm*—Bacon & Thomas, PLLC

(57) ABSTRACT

A pressure transducer, including a housing having a housing axis and a measuring cell chamber defined in the housing. The measuring cell chamber is exposable to a pressure via an opening. The opening is surrounded by an annular, first sealing surface. A pressure measuring cell having a second sealing surface facing towards the opening, and a support surface facing away from the sealing surface sealing ring; and a clamping apparatus, which engages the housing are provided. The pressure measuring cell and the sealing ring are clamped by means of an axial clamping force in such a manner between the clamping apparatus and the first sealing surface, that the sealing ring is arranged pressure-tightly between the first sealing surface and the second sealing surface. The pressure transducer further includes a misalignment accommodating arrangement, which includes a first transmission body, which faces toward the opening, and a second transmission body, which is facing away from the opening. The axial clamping force is transmitted through the misalignment accommodating arrangement, from the clamping apparatus to the pressure measuring cell, and the first transmission body is tiltable relative to the second transmission body about two mutually perpendicular axes.

10 Claims, 2 Drawing Sheets

U.S. PATENT DOCUMENTS

| | | | |
|---|---|---|---|
| 2005/0056097 A1* | 3/2005 | Banholzer et al. | 73/700 |
| 2007/0028696 A1* | 2/2007 | Drewes et al. | 73/700 |
| 2009/0158853 A1* | 6/2009 | Berner et al. | 73/724 |

FOREIGN PATENT DOCUMENTS

| | | |
|---|---|---|
| DE | 44 07 212 C1 | 8/1995 |
| DE | 196 28 551 A1 | 2/1997 |
| DE | 196 03 674 A1 | 8/1997 |
| DE | 100 64 811 A1 | 6/2002 |
| DE | 102 21 219 A1 | 12/2003 |
| DE | 102 27 479 A1 | 1/2004 |
| DE | 102 27 497 A1 | 1/2004 |
| DE | 102 43 079 A1 | 3/2004 |
| DE | 103 34 854 A1 | 3/2005 |
| EP | 0 723 143 A1 | 7/1996 |
| EP | 0 757 237 A2 | 2/1997 |
| EP | 0 995 979 A1 | 4/2000 |
| WO | WO 03/081197 A1 | 10/2003 |
| WO | WO 2005/012865 A1 | 2/2005 |

\* cited by examiner

PRESSURE TRANSDUCER

FIELD OF THE INVENTION

The present invention relates to a pressure transducer for the measuring of a media pressure.

BACKGROUND OF THE INVENTION

Especially in the case of pressure transducers used for pressure measurement in aggressive chemicals, the sealing between the pressure measuring cell and the media opening of the sensor housing proves to be difficult. Especially the usual elastic O-rings can not be used in all instances. Instead, flat seals, or gaskets, especially PTFE-seals, are used. It is true that, that PTFE does exhibit the desired chemical stability, but, on the other hand, it introduces mechanical problems, since PTFE does not have sufficient elasticity and even flows under pressure. Kathan et al. disclose in Laid Open German application DE 19628255 A1, a pressure measuring device, where an annular, flat seal of PTFE is axially clamped between the media-side face of the pressure measuring cell and an axial support surface of the sensor housing, with the axial support surface exhibiting resilient properties. This abutment, or clamping, is problematic, among other reasons, because a uniform compression of the flat seal is required. The smallest angular deviations of one of the components can lead to a failure of the seal.

SUMMARY OF THE INVENTION

An object of the invention is, therefore, to provide a pressure transducer, which overcomes the above-referenced disadvantages of the state of the art. This object is achieved according to the invention by a pressure transducer which includes, especially: A housing having a housing axis, in which housing a measuring cell chamber is defined, which is exposable to a pressure via an opening; wherein the opening is surrounded by an annular, first sealing surface having a first normal vector; a pressure measuring cell having a second sealing surface with a second normal vector and facing toward the opening, and an abutment surface with a third normal vector and facing away from the sealing surface; a sealing ring; and a clamping mechanism engaged with the housing; wherein the pressure measuring cell and the sealing ring are clamped by means of an axial clamping force in such a manner between the clamping mechanism and the first sealing surface, that the sealing ring is arranged pressure-tightly between the first sealing surface and the second sealing surface; characterized in that the pressure transducer has a misalignment accommodating arrangement, which includes a first transmission body facing towards the opening, and a second transmission body facing away from the opening; wherein the axial clamping force is transmitted through the misalignment accommodating arrangement from the clamping mechanism to the pressure measuring cell, and the first transmission body is tiltable with respect to the second transmission body about two mutually perpendicular axes.

The mutually perpendicular axes, about which the first transmission body is tiltable, extend preferably essentially perpendicularly to the housing axis and cut such. Essentially perpendicular means here, that the deviations from the perpendiculars are given solely by the orientation errors, which are to be accommodated by means of the misalignment accommodating arrangement.

In the ideal case, all of the mentioned normal vectors extend parallel to one another and to the housing axis. Solely because of manufacturing tolerances is it possible to have slight deviations from their being parallel. The tiltability of the transmission bodies about the described axes must, therefore, be over such a range that the deviations of the normal vectors from the direction of the housing axis due to manufacturing tolerances can be accommodated. A tiltability of about 0.5° or 1° can, for example, already be sufficient. If greater tolerances can be expected, a correspondingly greater tiltability is provided.

The misalignment accommodating arrangement can include, for example, a ball joint between the transmission bodies. The ball joint can include a ball, with, in this case, the two transmission bodies each having a ball bearing seat section, and the ball being compressed between the two ball bearing seats. On the other hand, the ball joint can have at least one convex ball surface section and at least one ball bearing seat section complementary thereto, with the first, or the second, transmission body, as the case may be, one having a ball surface section and one having at least one ball bearing seat section complementary thereto. The radius of the ball bearing seat can, as required, deviate from that of the radius of the ball surface.

In another embodiment, one of the transmission bodies includes a nipple having a tip and being in alignment with the axis of the transmission body, and the other transmission body includes, aligned with its axis, a bearing in which the tip of the nipple sits, in order to transmit the axial clamping forces. The bearing exhibits, preferably, a concave surface, whose vertex aligns with the axis, so that the nipple is centered with respect to the bearing by the axial clamping force.

In a further embodiment, the misalignment accommodating arrangement includes a universal joint located between the transmission bodies and having two mutually perpendicular axes. The axes extend, preferably, in a plane which is, except up to the orientation error to be accommodated, of not more than 2°, especially not more than 1°, perpendicular to the housing axis.

The two transmission bodies can, in each case, be separately manufactured parts, or they can be formed as single pieces including other components. For example, one of the transmission bodies can be integrated into another component of the clamping apparatus. Equally, one of the transmission bodies can be formed as one piece with a structural group of the pressure measuring cell, etc.

In a further development of the invention, the transmission body facing toward the pressure measuring cell comprises the same material as the pressure measuring cell, while the transmission body facing toward the clamping apparatus comprises a material of the clamping apparatus.

The pressure measuring cell includes, for example, a platform and/or a measuring membrane, or diaphragm, of a non-metallic material, especially a ceramic material or a semiconductor material. The housing and the clamping apparatus comprise, in contrast, a metal, for example steel, especially a stainless steel, or aluminum.

As discussed above, the tiltability is especially of interest for pressure transducers, in which the sealing ring includes at least one flat seal. In a currently preferred embodiment, the sealing ring includes a ceramic ring having two planparallel faces, on which, in each case, a flat seal is arranged.

Further details for the embodiment of the axially elastic element are disclosed in German published patent application no. 10334854.9.

In a further embodiment of a pressure transducer of the invention, an axially elastic element is provided. This axially elastic element can be e.g. a dish, or Belleville, spring, which, for example, forms the axial abutment surface, or is integrated thereinto, a bellows membrane, or diaphragm, which is integrated into the media opening, as well as a spring, e.g. a helical spring or a dish, or Belleville, spring, which is axially clamped between the rear side of the pressure measuring cell and a clamping ring. The axially elastic element assures such a degree of elasticity that the sealing elements are, in the case of pressure fluctuations and pressure jolts of the medium, as well as in the case of temperature fluctuations of the pressure transducer, only subjected to such fluctuations of the axial clamping pressure that remain below a compromising of the sealing effect. Additionally, the elastic element serves for compensating the setting, or plastic deformation, of the sealing element under load. The elasticity is, for example, so sized, that the axial clamping pressure on the first and second sealing elements fluctuates over temperature cycles between −40 C and 150 C by not more than 50%, further preferably by not more than 25%, and especially preferably by not more than 12% of the maximally occurring clamping pressure. Furthermore, it is currently preferred that the axial clamping pressure on the first and second sealing elements over temperature cycles between −40 C and 150 C does not sink below 0.8 MPa, preferably not below 0.9 MPa, and especially preferably not below 1 MPa.

Further details for the embodying of the axially elastic element are available in the German published patent application no. 10334854.9.

BRIEF DESCRIPTION OF THE DRAWINGS

The invention will now be explained on the basis of the appended drawings, the figures of which show as follows.

DESCRIPTION OF THE PREFERRED EMBODIMENTS

Figure 1:
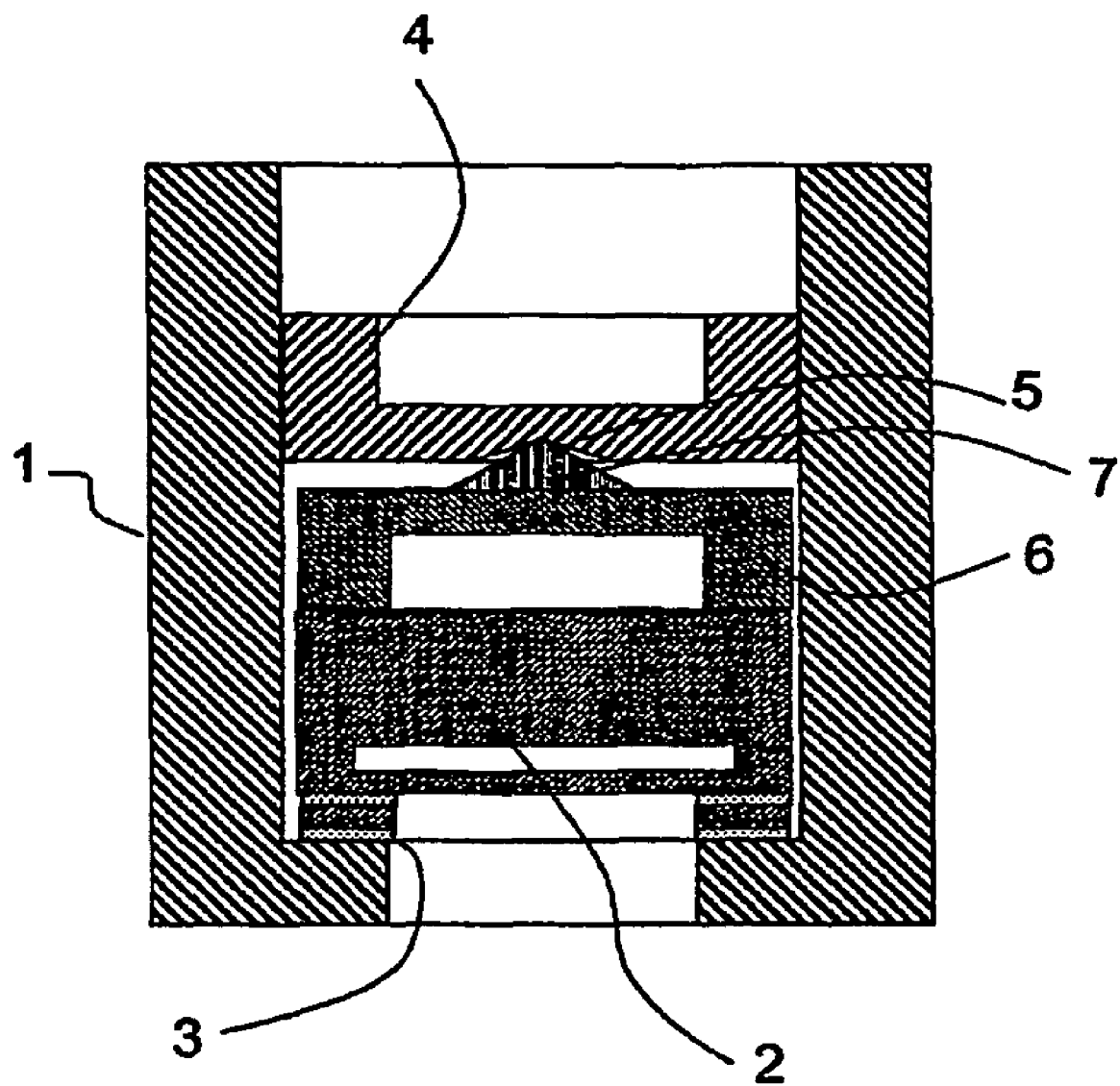
FIG. 1a is a longitudinal section through a first example of an embodiment of a pressure transducer of the invention.

The pressure transducer shown in FIG. 1 includes a cylindrical, ceramic, pressure measuring cell 2, for example comprised of a platform and a measuring membrane, or diaphragm, of corundum. The pressure measuring cell works according to the capacitive measuring principle. The pressure measuring cell 2 is arranged in a measuring cell chamber in a cylindrically symmetric housing 1. The housing 1 includes an opening, through which the measuring cell chamber can be exposed to a pressure. The opening is surrounded by a radially inwardly extending shoulder, which has an axial support surface for the pressure measuring cell. Between the pressure measuring cell and the axial support surface, a sealing ring 3 is arranged. The measuring cell is axially clamped against the sealing ring 3 by means of a clamping screw 4, which engages in a complementary thread in the wall of the measuring cell chamber.

The housing 1 and the clamping screw 4 comprise, in each case, a metal.

Between the clamping screw 4 and the pressure measuring cell, a decoupling body 6 is arranged, which transmits the axial clamping force from the clamping screw to the pressure measuring cell. The decoupling body is composed of the same material as the platform of the measuring cell 2, in order that, in the case of temperature fluctuations, no thermal expansion differences occur between the platform and the components bordering on the platform for introducing the axial clamping force.

The decoupling body includes a circularly shaped plate, which, on one surface, has a ring-shaped, protruding edge. This edge rests against the pressure measuring cell. On the side facing away from the ring, a cone-shaped nipple 7 is arranged, whose axis is aligned with the common axis of the ring and the circularly shaped plate. Nipple 7 serves as a first transmission body of a misalignment accommodating arrangement for accommodating orientation errors between the clamping screw and the decoupling body, or, lastly, between the housing and the pressure measuring cell. Nipple 7 is fixedly connected with the decoupling body 6 and is composed of the same material as the decoupling body 6. The connection between nipple 7 and the decoupling body can be, for example, a braze, especially an active braze.

The clamping screw 4 includes a plate in the form of a circular chip, in which a cone-shaped recess 5 is formed, which faces toward the conically shaped nipple 7 and has a larger angular span than nipple 7. The clamping screw serves as a second transmission body of the misalignment accommodating arrangement, for the clamping screw can exhibit a tilt, relative to the decoupling body, about arbitrary axes running through the contact point of the nipple 7 in the recess 5. This arrangement assures always homogeneous clamping forces on the sealing ring 3, despite possibly present manufacturing tolerances as regards the axial orientation of the clamping screw relative to the pressure measuring cell, or to the axial support surface about the housing opening.

Figure 2:
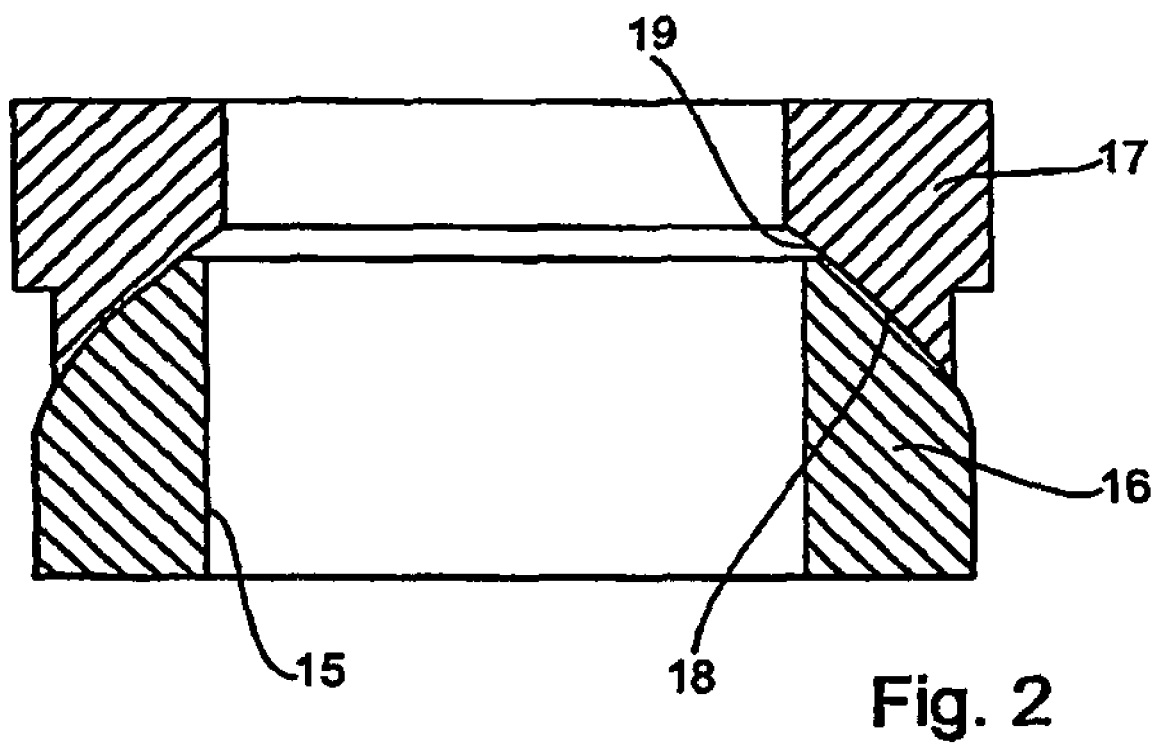
FIG. 2a is a longitudinal section through a second example of an embodiment of a misalignment accommodating arrangement for a pressure transducer of the invention.

FIG. 2 shows an alternative embodiment for a misalignment accommodating arrangement, which, in this case, includes a first, annularly shaped transmission body 16 and a second, annularly shaped transmission body 17. The first transmission body includes a first, planar end surface and a convex ball-shaped surface section 18, which faces away from the first planar end surface and toward the second transmission body 17. The second transmission body 17 includes a second planar end surface and a concave ball-shaped seat section 19, which faces away from the second planar end surface, is complementary to the convex, ball-shaped surface section and sits on such. The second planar end surface can, consequently, exhibit a tilt relative to the first planar end surface, in order that orientation errors can be accommodated. In a currently preferred version of this example of an embodiment, the second transmission body additionally includes on its outer surface a thread, which engages an internal thread of the measuring cell in the housing. Thus, the second transmission body serves as a screw-in ring. The second transmission body preferably sits on an annular, ceramic decoupling body, which transmits the axial clamping force onto the rear side of the pressure measuring cell. The first and second transmission bodies are, in the case of this example of an embodiment, manufactured of the same metal, for example a stainless steel. For increasing slidability, the ball surfaces are coated with a means exhibiting increased slidability.

The invention claimed is:
1. A pressure transducer, comprising:
a housing having a housing axis and a measuring cell chamber defined in the housing, the measuring cell chamber being exposable to a pressure via an opening in said housing, wherein said opening is surrounded by an annular first sealing surface having a first normal vector;
a pressure measuring cell having a second sealing surface characterized by a second normal vector and facing toward said opening, and a support surface characterized by a third normal vector and facing away from said sealing surface;

a sealing ring;

the pressure transducer including a misalignment accommodating element, which includes a first transmission body facing toward said opening and a second transmission body facing away from said opening; and a clamping apparatus engaged with said housing, wherein:

said pressure measuring cell and said sealing ring are clamped by means of an axial clamping force in such a manner between said clamping apparatus and said first sealing surface, that said sealing ring is arranged pressure-tightly between said first sealing surface and said second sealing surface; and the axial clamping force is transmitted through misalignment accommodating element from said clamping apparatus to said pressure measuring cell, and said first transmission body is tiltable relative to said second transmission body about two mutually perpendicular axes.

2. The pressure transducer as claimed in claim 1, wherein:
said misalignment accommodating element includes a ball joint between the transmission bodies.

3. The pressure transducer as claimed in claim 2, wherein:
said ball joint includes a ball, each of said two transmission bodies has a ball bearing seat section, and the ball is clamped between said two ball bearing seats.

4. The pressure transducer as claimed in claim 2, wherein:
said ball joint has at least one convex ball-shaped surface section and at least one ball bearing seat section complementary thereto.

5. The pressure transducer as claimed in claim 1, wherein:
said misalignment accommodating element includes a universal joint having between said transmission bodies two mutually perpendicular axes.

6. The pressure transducer as claimed in claim 1, wherein:
said misalignment accommodating element includes a nipple, which sits with a tip in a concave bearing seat.

7. The pressure transducer as claimed in claim 1, wherein:
said pressure measuring cell includes a platform and a measuring membrane, which are comprised of a ceramic material.

8. The pressure transducer as claimed in claim 1, wherein:
said housing is comprised of a metal, especially a stainless steel.

9. The pressure transducer as claimed in claim 1, wherein:
said sealing ring comprises at least one flat seal.

10. The pressure transducer as claimed in claim 9, wherein:
said sealing ring comprises a ceramic ring with two planparallel end faces, on which, in each case, a flat seal is arranged.

\* \* \* \* \*